United States Patent [19]

Waggener

[11] Patent Number: 5,430,848
[45] Date of Patent: Jul. 4, 1995

[54] DISTRIBUTED ARBITRATION WITH PROGRAMMABLE PRIORITIES

[75] Inventor: William N. Waggener, Sarasota, Fla.

[73] Assignee: Loral Fairchild Corporation, Syosset, N.Y.

[21] Appl. No.: 929,445

[22] Filed: Aug. 14, 1992

[51] Int. Cl.$^6$ .......................... G06F 13/00; G06F 1/04
[52] U.S. Cl. ..................................... 395/325; 395/550
[58] Field of Search ............... 395/325, 550; 370/85.1, 370/85.2

[56] References Cited

U.S. PATENT DOCUMENTS

| | | | |
|---|---|---|---|
| Re. 33,705 | 10/1991 | Caprio et al. | 395/325 |
| 4,229,791 | 10/1980 | Levy et al. | 395/325 |
| 4,320,502 | 3/1982 | deVeer | 370/85 |
| 4,412,281 | 10/1983 | Works | 395/575 |
| 4,442,504 | 4/1984 | Dummermuth et al. | 395/725 |
| 4,470,110 | 9/1984 | Chiarottino et al. | 395/200 |
| 4,481,580 | 11/1984 | Martin et al. | 395/325 |
| 4,499,538 | 2/1985 | Finger et al. | 395/325 |
| 4,556,939 | 12/1985 | Read | 395/325 |
| 4,560,985 | 12/1985 | Strecker et al. | 340/825.5 |
| 4,570,217 | 2/1986 | Allen et al. | 364/188 |
| 4,612,542 | 9/1986 | Pantry et al. | 340/825.5 |
| 4,637,013 | 1/1987 | Nakamura | 370/85.4 |
| 4,654,857 | 3/1987 | Samson et al. | 371/9.1 |
| 4,730,268 | 3/1988 | Marin | 395/325 |
| 4,766,536 | 8/1988 | Wilson, Jr. et al. | 395/325 |
| 4,785,394 | 11/1988 | Fischer | 395/325 |
| 4,785,396 | 11/1988 | Murphy et al. | 395/325 |
| 4,802,161 | 1/1989 | Byars et al. | 370/94 |
| 4,908,749 | 3/1990 | Marshall et al. | 395/325 |
| 4,972,313 | 11/1990 | Getson, Jr. et al. | 395/325 |

*Primary Examiner*—Jack B. Harvey
*Assistant Examiner*—Glenn A. Auve
*Attorney, Agent, or Firm*—Sterne, Kessler Goldstein & Fox

[57] ABSTRACT

A computer bus for transferring data among a plurality of modules coupled thereto, and having flexible, distributed bus arbitration. A plurality of data lines is operable to transfer bits of data among modules attached to the bus. A single arbitration line is coupled to each module, and is used to indicate whether the bus is available for the next bus cycle. A bus packet clock, called a BUP clock, is used to divide the bus into cycle periods called BUP time slots. An access time clock further divides these BUP time slots into time access slots. The BUP time slot is the unit of time for which a module will be granted access to the bus. The BUP time slot is selected so that modules will be granted access to the bus for a length of time defined by a packet length. Each module on the bus is provided with arbitration circuitry for determining whether that module will be granted access to the bus for the next BUP time slot. The arbitration circuitry counts the number of accessed time slots and compares the counter value to a module priority value and outputs a comparison time pulse when the values compare. A module with a lower priority number will pull the arbitration line low and claim the bus for the next BUP time slot if this module is requesting the bus for the next BUP time slot. Once a module has pulled the arbitration line low, no other module will be granted access to the bus for the next BUP time slot. When the next BUP time slot occurs, the module granted access to the bus for that period will be given access, and the counters of each module will be reset, and the priority of each module updated.

30 Claims, 9 Drawing Sheets

DISTRIBUTED ARBITRATION WITH PROGRAMMABLE PRIORITIES

BACKGROUND OF THE INVENTION

1. Field of the Invention

The present invention relates generally to computer bus architectures, and more specifically to a virtual packet bus for packetized communications including a distributed arbitration technique with flexible prioritization.

2. Related Art

In digital computer systems having a plurality of modules, such as processor modules, controller modules, communications interface (relay) modules, etc., a medium is employed whereby these modules can transfer data among each other. Typically, the medium employed is a physical data channel known as a bus. The bus is connected to a communications port on each module. In typical data bus architectures, information is conveyed over the bus one word at a time. In addition, since there are multiple modules sharing the same bus, the modules must contend for bus access for each word sent.

A computer bus typically comprises multiple lines for transferring and for controlling the transfer of different types of information among the modules attached to the bus. Conventional bus architectures include a parallel data bus structure and multiple control lines. The data bus is typically N bits wide, where N is the number of bits per word.

Temporally, the bus is divided into a series of time slots known as bus cycles. A bus cycle is the period of time for which a module is granted access to the bus. In conventional bus architectures, the bus cycle is the same length as a clock cycle. Thus, in conventional systems, one N-bit word is transferred by a module on each clock cycle.

A common scenario in a computer system with a conventional bus architecture will now be described. A first module has a word or series of words that it wishes to send (or transfer) to a second module over the data bus. The first module signals that it wishes to access the bus. A means for arbitrating access to the bus determines whether the first module will be granted access on the next bus cycle. If access is not granted to the first module, the first module must repeat its request until access is granted. Once bus access is granted to the first module, it may send the first word to the second module via the bus. The same process must repeat again for each subsequent word the first module wishes to send. In some cases, limited forms of multiple word transfers by one module may be permitted.

Conventional bus architectures are limited in two respects. First, they are limited in that they allow only single-word transfers (or limited multiple-word transfers) for each bus cycle. Second, they are limited in the arbitration techniques employed to control access to the bus by the various modules.

These conventional bus architectures having single-word bus access provide the computer system with only limited communications flexibility, and do not provide optimum system performance in all environments. In certain environments, the computer system may be required to interface with various telecommunications networks. For example, the computer system may be implemented as a communications controller, controlling communications among the networks interfaced at a node. As an alternative example, the computer system may be used for scientific or business purposes and simply interfaced to the networks to obtain data.

Regardless of the underlying function of the computer in these environments, the computer is required to take data from, and sometimes put data onto, the various telecommunications networks to which it interfaces. These telecommunications networks typically operate on a packet level. That is, the networks transfer data in units defined as packets. The characteristics of the packet are defined according to the particular communications standard followed. Packets are typically defined as a specific number of bits in length, or a specific number of octets. For example, the Asynchronous Transfer Mode (ATM) communications specification has defined a 53-octet packet.

One word or limited multiple word transmission schemes implemented in conventional bus architectures are not directly compatible with these packet-level communications standards. If, for example, a packet of data is received at a network interface card, that packet cannot be directly sent across the conventional computer bus. Instead, the data must be 'depacketized' (removed from the packet), sent across the bus one N-bit word at a time, and, if destined for further communications across another network, reassembled into packets. This incompatibility leads to a requirement for additional circuitry in the interface modules. This additional circuitry must allow interface cards to depacketize the data, reassemble the data into packets, and operate at both the packet level and the word level.

Conventional bus architectures are limited in their arbitration techniques. In many conventional systems, bus arbitration is handled by a central arbiter. In these systems, each module has a bus access request line and a line signalling the module when access is granted. Often, other control lines are added to provide additional information such as the state of the arbitration system. In systems using centralized arbitration, each module sends a bus access request to the central arbiter. Each access period, the central arbiter grants bus access to a module based on the priority of the requesting modules.

Other arbitration schemes have distributed the arbitration function to the modules attached to the bus. In these systems, arbitration circuitry is contained in each module, thus allowing the modules themselves to determine whether they are allowed access to the bus. Often these systems require arbitration busses to enable distributed arbitration. These arbitration busses are typically Y or 2Y lines wide, where Y is the number of modules. As with a centralized system, contention is resolved by evaluating the priority of the requesting systems and granting access to the requesting module with the highest priority.

Conventional arbitration techniques are limited in the manner in which module priority is assigned, thus restricting the flexibility of computer bus operations. This limitation is present in both centralized and distributed arbitration schemes. In conventional systems, priorities are assigned in various ways. First, priorities may be assigned based on a physical address, a bus location, or the card-slot location of the module. These priorities are fixed and cannot be changed unless the module is relocated or its address changed. Conventional arbitration schemes using this first type of prioritization technique sometimes allow flexibility by rotating the order of priority among the module locations.

A second method of assigning priorities in conventional systems is by making an initial assignment, and then rotating the priority of each module at the start of each subsequent bus cycle. In this method, each module starts with an initial priority. Each time access is granted to a module, module priorities shift. In some schemes, the priorities of each module are all incremented or decremented in a fixed manner.

Thus, conventional bus architectures are limited in two respects. They are limited in that they allow only for the transfer of a single word of data for each bus cycle. They are also limited in that the arbitration techniques employed provide limited flexibility in assignment and revision of module priorities. Additionally, conventional distributed arbitration techniques require arbitration buses with multiple signal paths, or the number of signal paths proportional to the number of modules on the bus.

Thus, conventional bus architectures are limited in the flexibility they provide for interfacing to external communication networks and are limited in their arbitration and module priority assignment techniques.

SUMMARY OF THE INVENTION

The present invention provides a system and method for bus communications at the packet level, including flexible, distributed bus arbitration. The bus according to the present invention is structured to transfer data in units of packets, wherein packets comprise a plurality of words N bits in length, where N is the width of the data bus.

The arbitration scheme according to the present invention is a distributed arbitration technique, whereby each module contending for bus access is provided with bus arbitration logic. A single bus arbitration line is provided to interface to each module's arbitration circuit. The bus arbitration logic comprises logic for determining the module's priority and for determining when the module is to be granted bus access based on the module's priority.

According to the present invention, the bus is divided in time into bus cycle periods known as Bus Packet or BUP time slots. A BUP time slot defines the time period for which a module is granted access. Access for each BUP time slot is arbitrated by the arbitration circuitry. The BUP time slot is further divided into access time slots using an access time clock signal.

According to the present invention, a digital counter is reset at the beginning of the BUP time slot using a BUP clock. The digital counter begins counting pulses of the access time clock, thereby counting access time slots. The counter output value is output to a comparator.

A state machine indicates the priority of the module and outputs a priority value to the comparator. The comparator compares the priority value to the counter value, and when these values are equal, the comparator provides a comparison time pulse. The comparison time pulse is used to ultimately claim access to the bus.

The comparator of each module is comparing the number of access time slots counted to the module's priority value. Thus, a comparison time pulse will be generated sooner for a module with a lower priority number (i.e., a higher priority). The first module to request bus access and to generate a comparison time pulse will ultimately pull the arbitration line low thereby denying access to the other modules.

If a module with a higher priority (lower priority number) has not already requested access to the bus and pulled the arbitration line low, the comparison time pulse of a requesting module is used to generate a bus available signal if this module is requesting the bus. This bus available signal is then used to pull the arbitration line low thus inhibiting other modules from obtaining bus access.

Bus arbitration takes place during a current BUP time slot to determine which module will have access to the bus for the next BUP time slot. At the beginning of each BUP time slot, a counter value is reset to its initial value and the priority of the module can be updated based on a number of prioritization schemes. A number of prioritization schemes can be used to establish the priority of the modules for each BUP time slot. The ability to implement different priority schemes provides maximum system flexibility.

Further features and advantages of the present invention, as well as the structure and operation of various embodiments of the present invention, are described in detail below with reference to the accompanying drawings. In the drawings, like reference numbers indicate identical or functional similar elements. Additionally, the leftmost digit of a reference number identifies the drawing in which a reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

Table of Contents

1. Overview of the Present Invention
2. Sample Environment
3. The Bus
4. Bus Arbitration
5. Prioritization Techniques
6. Extension of the Module Capacity
7. Operation at High Speeds
   1. Overview of the Present Invention The present invention provides a system and method for packetized bus communications including flexible, distributed bus arbitration. The bus according to the present invention is structured to handle data transfers in units of packets. The packets comprise M words, where each of the M words is N bits in length. N is the width of the data bus.

The bus uses a distributed arbitration scheme, whereby each module contending for bus access has bus arbitration logic. The bus arbitration logic comprises logic for determining the module's priority, and for determining when the module is granted bus access based on the module's priority.

The bus arbitration logic is capable of providing flexible prioritization schemes. According to the present invention, a number of alternative prioritization schemes may be employed. Through these schemes, system flexibility and adaptability are enhanced.

Thus, arbitration according to the present invention, can be implemented using only a single bus arbitration line connected to each module. This single bus arbitration line is used to indicate whether another module has already been granted access to the bus during the next bus cycle.

2. Sample Environment

Figure 1:
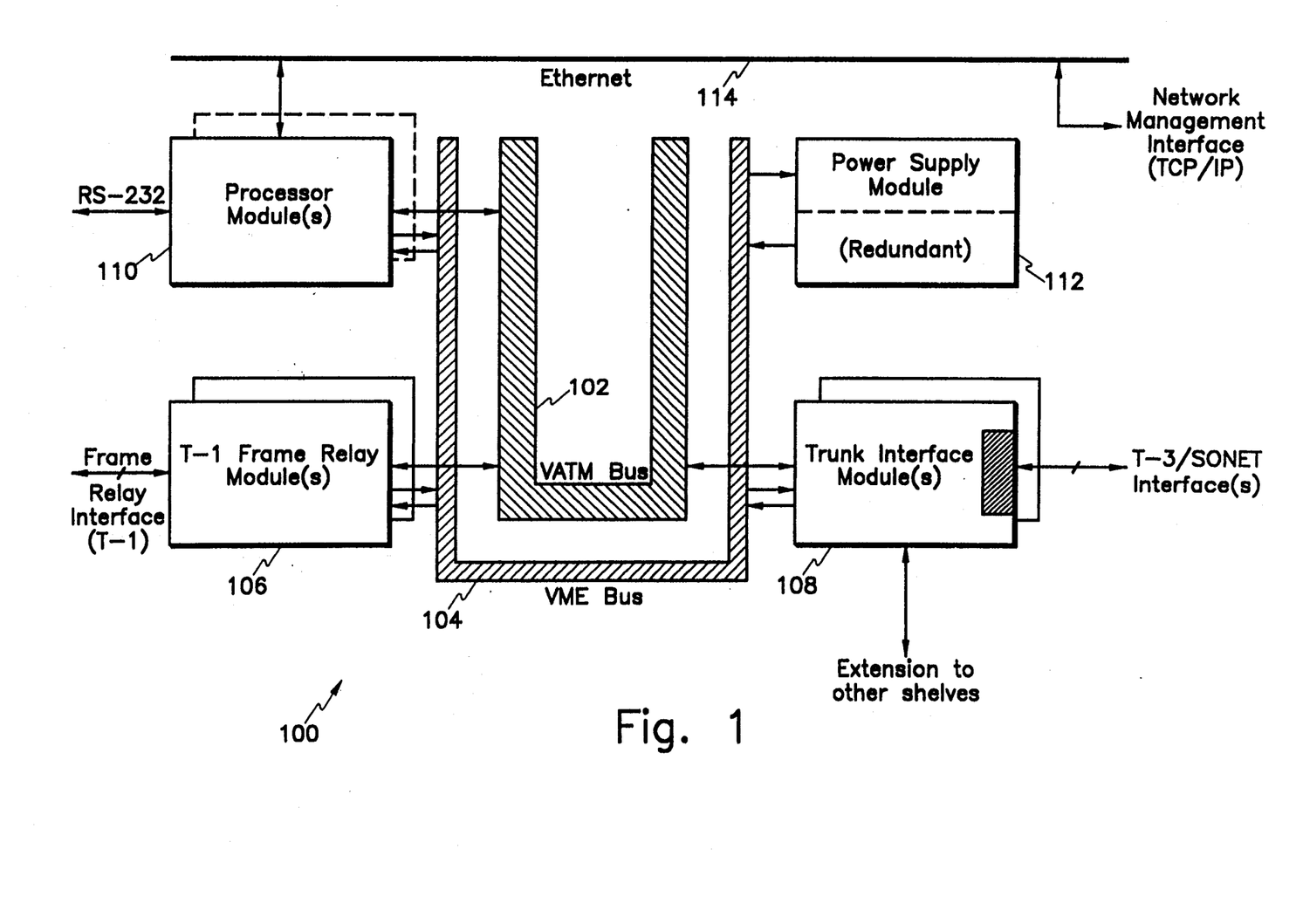
FIG. 1 is a block diagram illustrating a computer system functioning as a network communications node that is an example environment of the present invention.

The present invention was developed for use in a computer system that functions as a network packet switch. FIG. 1 is a block diagram illustrating a computer system configured as a network packet switch 100 and its typical interfaces. Referring to FIG. 1, the sample environment will now be described. A network packet switch 100 of the sample environment includes two separate busses. A Virtual Packet Bus 102 (referred to as VPB 102) is a high speed, Virtual Asynchronous Transfer Mode (VATM) bus according to the present invention. A standard VME bus 104, for handling local, low speed status and control information, is also provided.

T-1 frame relay modules 106 accept up to four T-1 frame relay channels, and packetize the data from these channels into ATM (Asynchronous Transfer Mode) packets. Trunk interface modules 108 accept ATM packets from VPB 102. Trunk interface modules interface the ATM packets with standard T-3 or SONET formats for transport. Processor modules 110 provide network element management and interface to an external ethernet network 114. External ethernet network 114 provides the node with a network management interface. A dual redundant power supply module 112 provides system power.

The function of network packet switch 100 is to receive data packets originating with users of network data services such as Frame Relay Service and Switched Multi-megabit Data Service (SMDS), and route these data packets to other network nodes in accordance with the address of the packets. Additionally, network packet switch 100 receives data packets from other nodes addressed to the location of the packet switch. VPB 102, which is the subject of this invention, provides the internal communication path for the data packets between user access modules such as the T-1 frame relay module 106 and inter-nodal communications links, commonly called trunks, such as trunk interface modules 108. Packets originating at a user interface on one of a multiplicity of frame relay modules 106 may be routed over the bus to any one of the trunk modules 108 or to other local users through frame relay modules 106.

3. The Bus

Figure 2A:
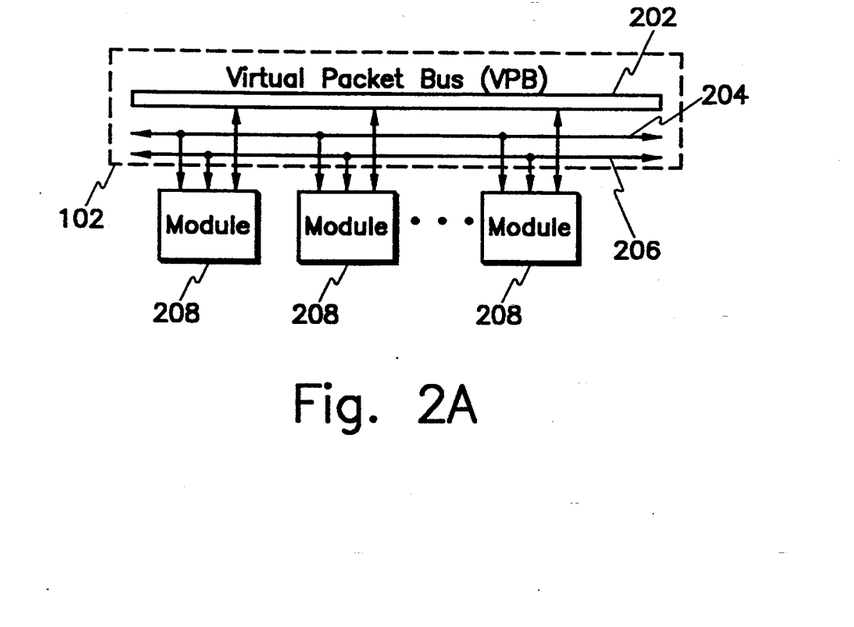
FIG. 2A is a block diagram illustrating the structure of the virtual packet bus according to the present invention.

FIG. 2A illustrates VPB 102 according to the present invention. Referring to FIG. 2, VPB 102 comprises a data bus 202, a common bus arbitration line 204 and a bus packet (BUP) clock line 206. In a preferred embodiment, VPB 102 is a backplane bus to which a plurality of modules 208 are interfaced. Modules 208 can be circuit cards that are plugged into backplane VPB 102 using card-edge connectors. Modules 208 can include modules such as processor module 110, and trunk interface module 108, as discussed in the Sample Environment Subsection of this application.

In a preferred embodiment, data bus 202 is 64 bits wide (i.e., N is 64). This width makes VPB 102 compatible with a 53 octect packet standard and still allows additional bits for other system functions. The preferred embodiment of the virtual packet bus uses 53 octet ATM packets. With a 64 bit wide data bus, seven (7) bus transfers are required for each packet leaving 3 octets available as extra bits (7 bus transfers·8 octets per transfer−53 octets). These additional bits may be used for a variety of purposes such as carrying error correcting parity information to detect packet errors, to carry status information and so forth. Other embodiments are contemplated wherein data bus 202 is of a width other than 64 bits.

A unique feature of VPB 102, according to the present invention, is that it allows data transfer in groups of words (packets). A packet is defined as having a length of M words. In a preferred embodiment, the packet length is seven words (i.e., M is 7). To handle data transfer in units of packets, the length of the bus cycle is defined to cover the packet length. Thus, VPB 102, according to the present invention, uses a packet timing concept to define the bus cycle.

Figure 2B:
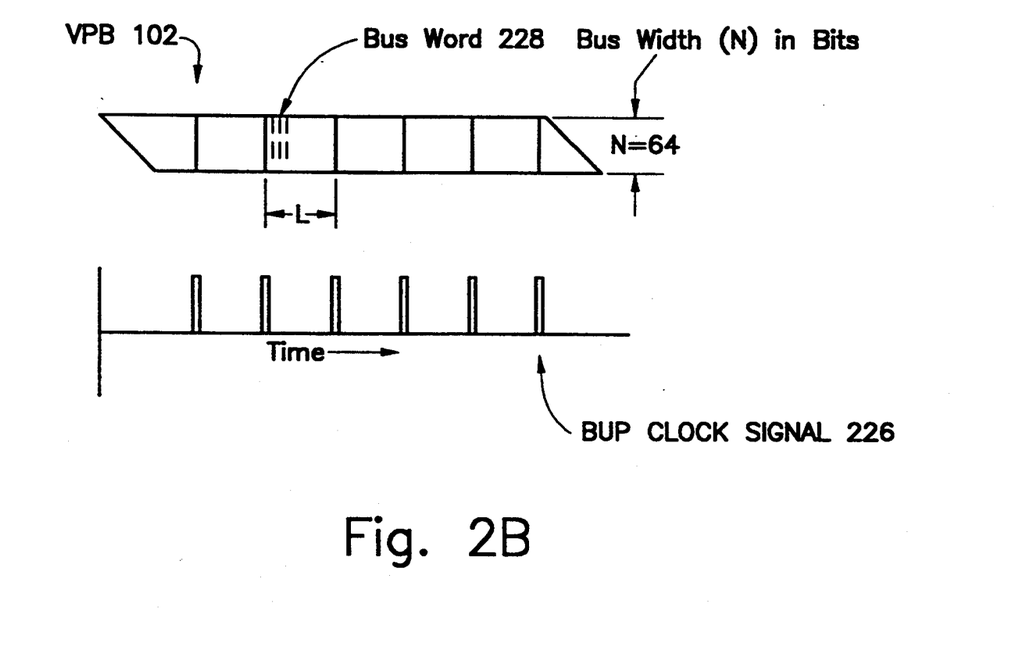
FIG. 2B is a timing diagram illustrating division of the virtual packet bus into BUP time slots.

FIG. 2B illustrates the packet timing concept of VPB 102 according to the present invention. Referring to FIGS. 2A and 2B, the packet timing concept will now be described. BUP clock line 206 provides a BUP clock signal 226 to all modules 208 on VPB bus 102. BUP clock signal 226 temporally partitions VPB 102 into bus cycle periods. These bus cycle periods are called BUP time slots. BUP clock signal 226 is a timing pulse that marks the start of each BUP time slot. The length of the BUP time slot L is sufficient to handle the bus packet length M. Bus packet length L is the minimum data transfer time unit of VPB 102. All packet transfers on VPB 102 are made within the BUP time slot as defined by BUP clock signal 226.

Thus, in a preferred embodiment where M=7, bus packet length L is chosen such that seven N-bit bus words 228 can be transferred within that time. Thus, data bus 202 can be defined in terms of a width of N bits and periods of length defined by the bus packet length L.

4. Bus Arbitration

According to the present invention, bus arbitration is handled on a distributed basis. Each module on the bus is provided with arbitration circuitry to determine during the current BUP time slot whether its module can access the bus during the next BUP time slot. Arbitration circuitry includes logical elements for determining the current module priority, and for determining whether bus access will be allowed based on that priority. Circuitry is also provided for updating the module priority. Arbitration circuitry is provided with BUP clock 226 and with an access time clock.

During the current BUP time slot, the arbitration circuitry begins counting pulses of the access time clock signal. The arbitration circuitry compares the counted value to the current module priority. When the counted value equals the module priority, the module will be granted access to the bus during the next BUP time slot if two conditions are met. The two conditions are: (i) the module must be requesting access; and (ii) the bus must not already have been claimed by a module with a higher priority. When a module is granted access to the bus, that module pulls the arbitration line low until the current BUP time slot has expired. When the arbitration line is low, no other module will be granted access for the next BUP time slot.

Figure 3:
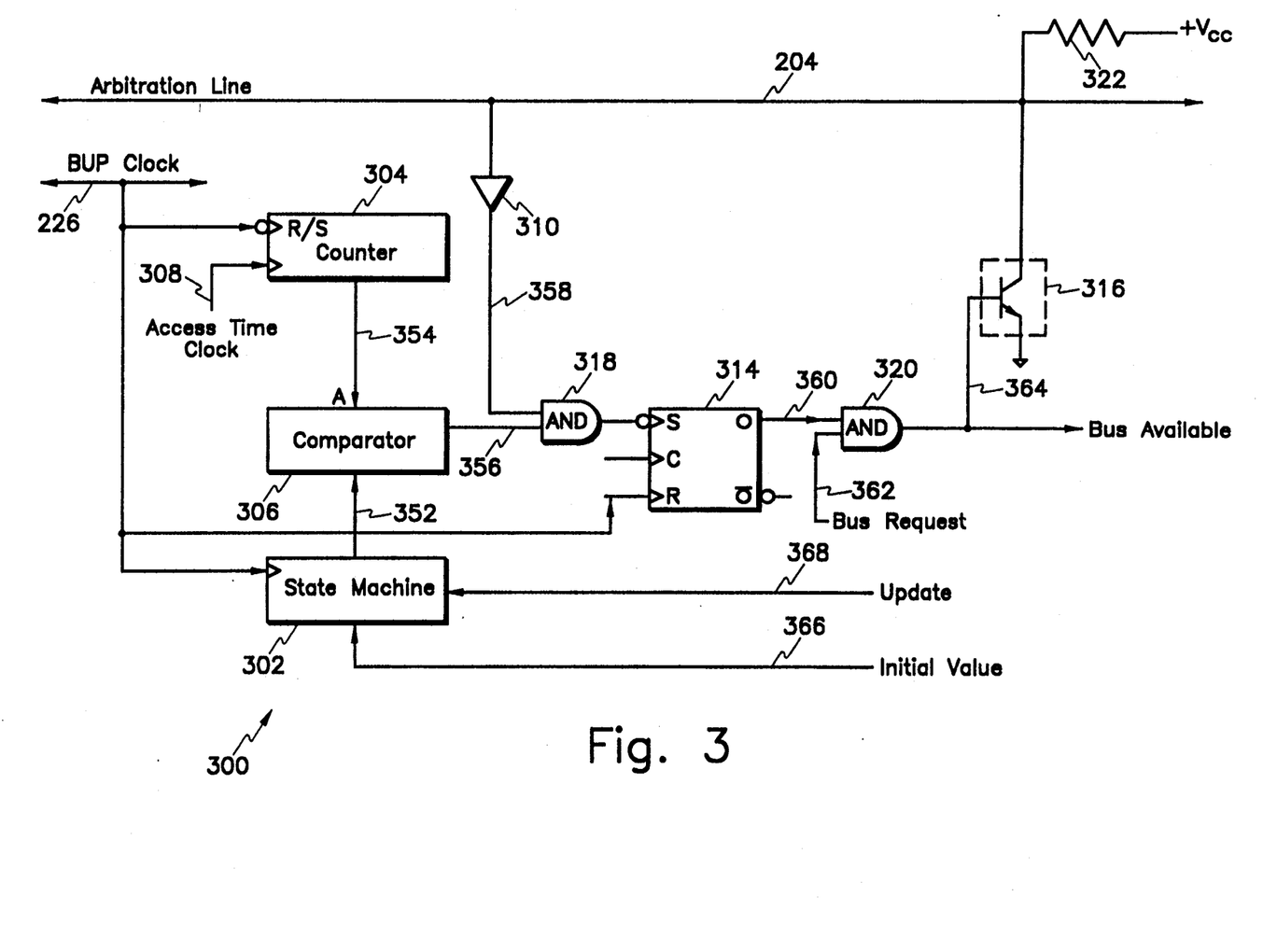
FIG. 3 is a circuit diagram illustrating an embodiment of the present invention.

FIG. 3 is a schematic diagram illustrating the arbitration circuitry according to the present invention. Referring to FIG. 3, a bus arbiter 300 is interfaced to common bus arbitration line 204, to an access time clock 308, and to BUP clock signal 226.

Bus arbiter 300 comprises several logic components. These components will now be described. Bus arbiter 300 includes a state machine 302. State machine 302 is used to indicate the priority of the module in the digital form. Bus arbiter 300 also includes a counter 304 and a comparator 306. Counter 304 counts edges of access time clock 308. In a preferred embodiment, counter 304 begins at an initial value, increments its value on each positive transition of access time clock signal 308, and the counter value is output as a counter value signal 354. Counter 304 is reset to its initial value by BUP clock signal 226. Alternative embodiments may be considered wherein counter 304 decrements as opposed to increments, and where counter 304 responds to negative transitions.

Comparator 306 compares the priority of the module as indicated by state machine 302 against counter value signal 354.

A buffer 310 is used to monitor arbitration line 204 to determine if access to the bus is still available for the next BUP time slot. If arbitration line 204 is high, the bus is still available for the next BUP time slot. If, however, arbitration line 204 is low, another module has already claimed the bus for the next time slot.

A flip flop 314 is set when counter 304 reaches the module's priority as indicated by state machine 302 if the bus is still available at the next BUP time slot. When flip flop 314 is set and the module is requesting bus access for the next BUP time slot, a transistor 316 is turned on. When transistor 316 is turned on, arbitration line 204 is pulled low, thus disabling other modules from accessing the bus on the next BUP time slot.

State machine 302 is loaded with an initial value, indicating the initial priority of the module, via an initial value signal 366. The priority value of the module can be updated for each BUP time slot by an update signal 368.

Figure 4A:
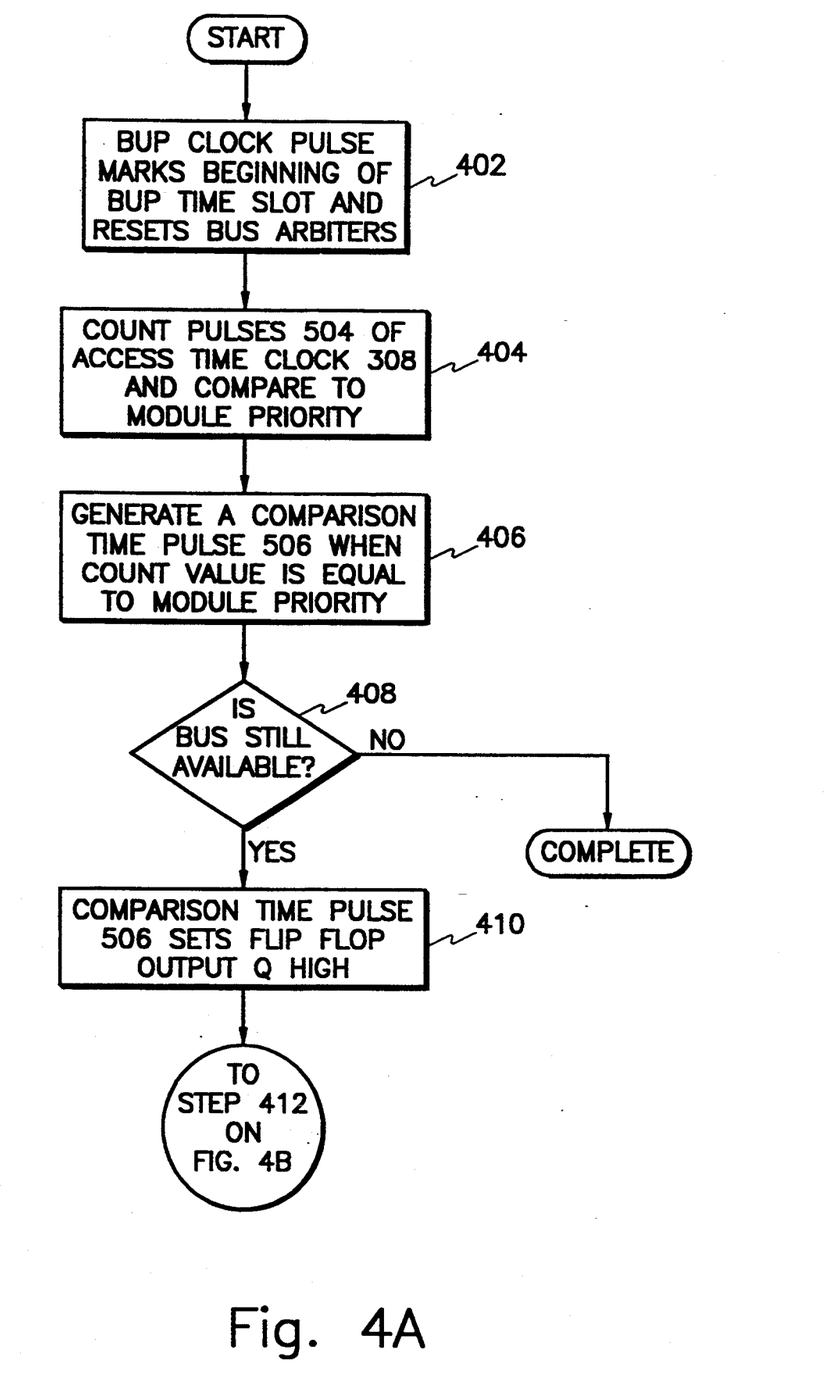
FIGS. 4A and 4B comprise a flow chart illustrating the operation of the present invention.
Figure 4B:
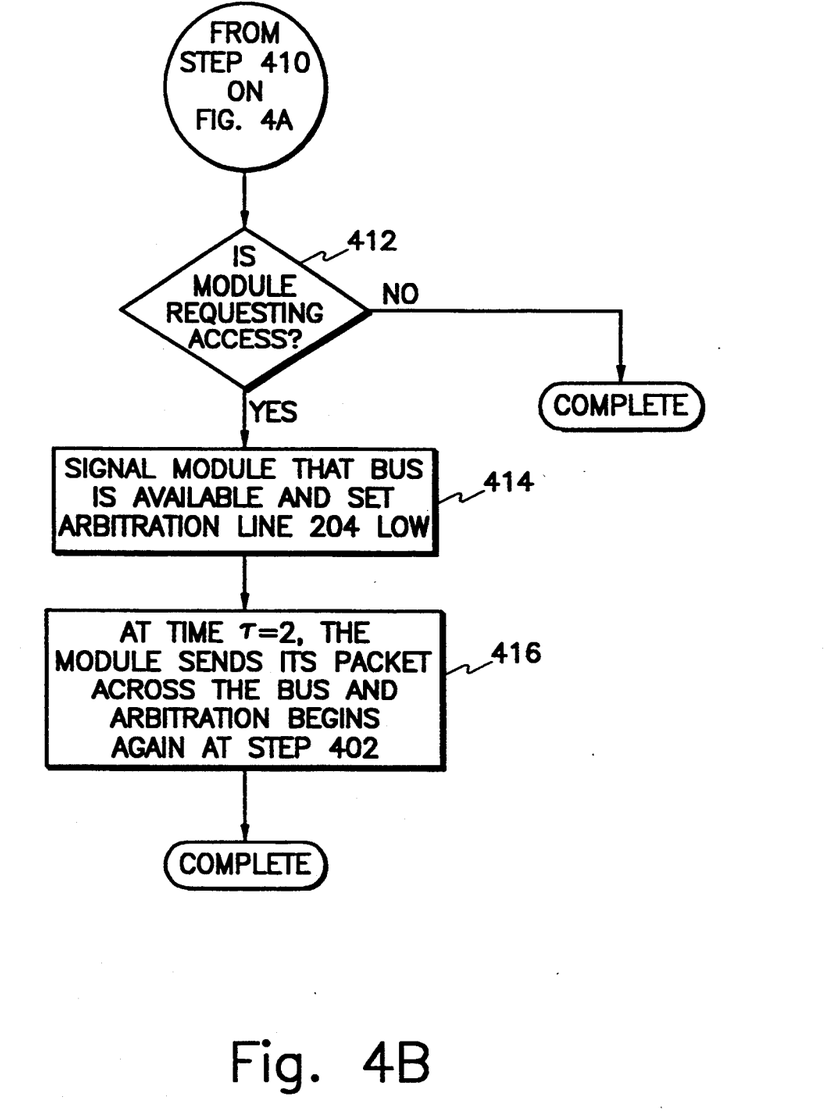
Figure 5:
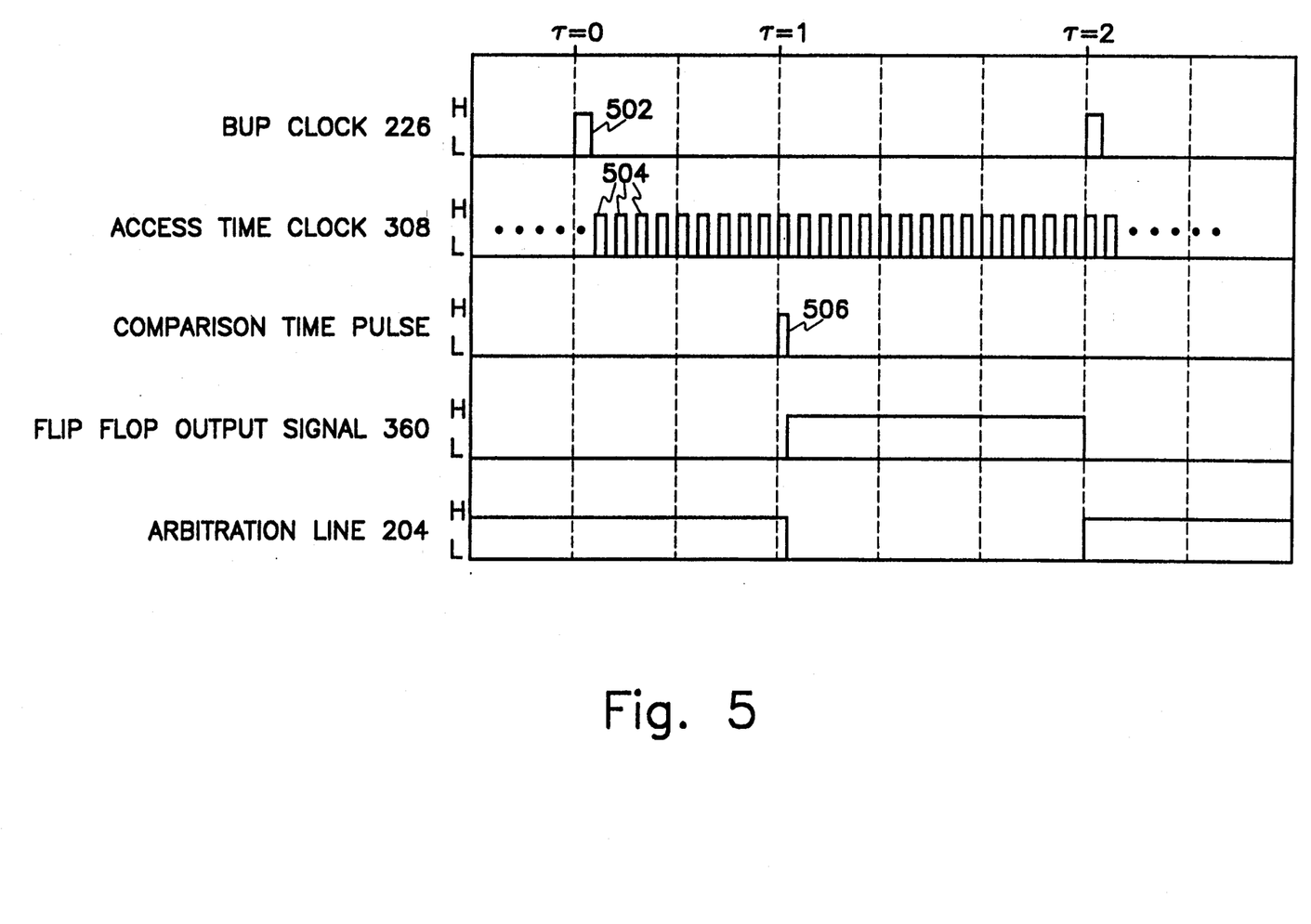
FIG. 5 is a timing diagram illustrating the temporal placement of key timing signals of an arbitration circuit according to an embodiment of the present invention.

FIGS. 4A and 4B comrpise a flow chart illustrating the operation of bus arbiter 300 according to the present invention. FIG. 5 is a timing diagram illustrating the temporal relationships among the various signals of bus arbiter 300 of the present invention. Referring to FIGS. 3, 4A and B, and 5, the operation of bus arbiter 300 will now be described. The operation of bus arbiter 300 of a sample module will be described with respect to events occurring in bus arbiters 300 of other modules. Bus arbiter 300 for each module operates in a similar fashion.

In a step 402, at a time $\tau=0$, a BUP clock pulse 502 of BUP clock signal 226 marks the beginning of a current BUP time slot. The time during this current BUP time slot will be used to determine which module will be granted access to the bus during the next BUP time slot. The next BUP time slot begins at a time $\tau=2$. Additionally, BUP clock pulse 502 resets counter 304 to an initial value, and resets flip flop 314. In addition, BUP clock pulse 502 sets state machine 302 to an initial priority value as determined by initial value signal 366 or to an updated priority value as determined by update signal 368.

In a step 404, counter 304 begins counting pulses 504 of access time clock 308. Access time clock 308 runs at a rate higher than BUP clock 226. Thus, counter 304 essentially divides each BUP time slot into a distinct number of shorter time slots as illustrated in FIG. 5. The length of these time slots is defined by the period of access time clock 308. For example, if access time clock 308 is 16 times higher in rate than BUP clock 226, counter 304 will increment (or decrement) 16 times within the BUP time slot. Thus, in this example, counter 304 will divide the BUP time slot into 16 segments.

Counter 304 begins counting pulses 504 of access time clock 308 from its initial value, and outputs counter value signal 354 to comparator 306. Counter 304 continues counting pulses 504 until the next BUP clock pulse 502 resets counter 304 to its initial value. Once reset, counter 304 begins anew, counting from its initial value. In a preferred embodiment, counter value signal 354 is in the form of a digital word. The width of the word is chosen to accommodate the maximum value reached by counter 304. This maximum value may be defined by the ratio of access time clock frequency 308 to BUP clock 226 frequency.

State machine 302 indicates the priority of the module continuously throughout the BUP time slot period. State machine outputs a module priority value signal 352 (referred to as time access state 352) to comparator 306. Each module on the bus has a unique time access state 352 at any given BUP time slot. In a preferred embodiment, the module time access state 352 is indicated in the form of a digital word. The width of this digital word is chosen to be wide enough to allow a unique time access state 352 to be represented for each module.

As counter 304 is counting pulses 504, comparator 306 is comparing counter value signal 354 to time access state 352 as indicated by state machine 302.

In a step 406, when counter value signal 354 is equal to time access state 352 (i.e. the priority value), comparator 306 sends a comparison time pulse 506 over a comparator output signal path 356. Comparison time pulse 506 indicates that the module's time access state 352 has been reached by counter 304. The occurrence of this event is denoted by a time $\tau=1$ in FIG. 5.

If, as in the example above, access time clock 308 divides the BUP time slot into 16 segments, 16 distinct counts are produced by counter 304 in one BUP time slot. Thus, in this example, 16 modules can have unique time access states 352. Each of these unique time access states 352 defines a unique time access window in a BUP time slot.

In a step 408, if another module having a higher priority than the subject module has requested access to the bus for the next BUP time slot, arbitration line 204 will already be at a low state (to be described), and the arbitration process is complete. The subject module is not granted access for the next time slot. The arbitration process will begin again at step 402 with the next BUP clock pulse 502 of BUP clock 226. If, on the other hand, the bus is still available for the next BUP time slot, bus arbiter 300 continues the process at a step 410. Step 408 is discussed in greater detail below.

In step 410, comparison time pulse 506 is input to flip flop 314 at an input port S. Comparison time pulse 506 sets an output port Q of flip flop 314 high. This results in a flip flop output signal 360 transitioning to a high state.

In a step 412, if the module is not requesting access to the bus for the next arbitration period, a bus request signal 362 is low and the arbitration process for this module is finished. Arbitration will begin again at step 402 with the next BUP clock pulse 502 of BUP clock 226.

If, however, the module is requesting access to the bus for the next arbitration period, the module asserts a high bus request signal 362. In a step 414, the high flip flop output signal 360 and the high bus request signal 362 input to an AND gate 320 cause bus available signal 364 to transition to high. When bus available signal 364 is high, transistor 316 turns on. The collector of transistor 316 is connected to bus arbitration line 204 and the source is connected to ground. Bus arbitration line 204 is kept high with a pull-up resistor 322 to $V_{cc}$. Thus, when transistor 316 is turned on by a bus available signal 364 at its base, bus arbitration line 204 is pulled to ground. When bus arbitration line 204 is low, no other module will be granted access to the bus.

In addition, bus available signal 364 indicates to the module that the module has been granted access to the bus for the next BUP time slot.

In the preferred embodiment transistor 316 is a bipolar transistor. As will be clear to one of ordinary skill in the art, any type of electrical switching device which is sufficiently fast can perform the same function as transistor 316. Alternative switching devices include MOS field effect transistor devices or standard logic gates capable of pulling the arbitration line to ground.

In a step 416, at a time $\tau=2$, the module granted access sends its packet across the bus. At this time the arbitration process begins again at step 402. Pulse 502 of BUP clock 226 resets counter 304 to its initial value, updates (or, alternatively, resets) the priority of state machine 302 and resets flip flop 314. When flip flop 314 is reset, flip flop output signal 360 is set low. This causes bus available signal 364 to go low, turning off transistor 316. With transistor 316 off, bus arbitration line 204 is pulled high by pull-up resistor 322.

As discussed above in step 408, the subject module will not be granted access to the bus unless no other higher priority modules are requesting access. The manner in which this determination is made will now be described in more detail. Counter 304 for each module counts pulses 504 of access time clock 308. In an example embodiment, counter 304 is implemented as an up counter and begins its count from an initial value of zero. Thus a module with a lower time access state 352 will generate its comparison time pulse 506 before a module with a higher time access state 352. The first module to generate comparison time pulse 506 and request the bus with a high bus request signal 362 will pull arbitration line 204 low as discussed above. Access will be granted to that module for the next BUP time slot. Therefore, access to all other modules must be disallowed.

Once a module has pulled arbitration line 204 low, a buffer 310 on each bus arbiter 300 asserts a low bus busy signal 358 to an input to an AND gate 318. This low bus busy signal 358 inhibits comparison time pulse 506 from setting flip flop 314. Thus, once a module pulls arbitration line 204 low, no other module may set its flip flop output signal 360 high, generate a high bus available signal 364, and access the bus for the next BUP time slot.

Additional embodiments can be conceived as encompassing alternative implementations of bus arbiter 300. For example, flip flop 314 could be a JK flip flop clocked by comparison time pulse 506. The J input in this embodiment would be bus request signal 362. Thus when bus request signal 362 is high and comparison time pulse 506 occurs, the Q output is a high signal. The JK flip flop would still be reset by BUP clock 226.

Figure 6:
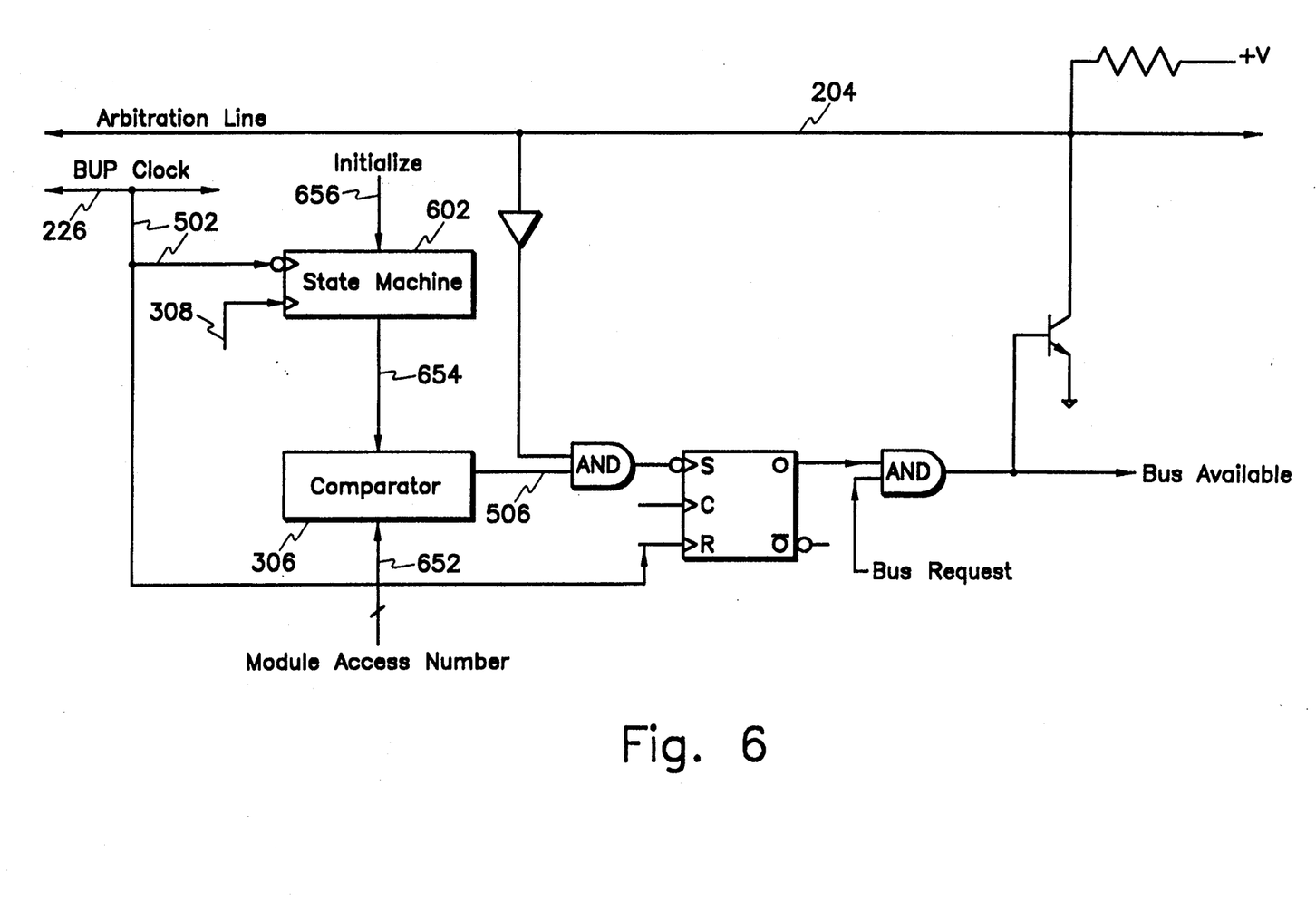
FIG. 6 is an alternative embodiment of the present invention implemented without a counter.

An additional alternative embodiment for bus arbiter 300 can be implemented by replacing counter 304 with a state machine and eliminating state machine 302. FIG. 6 is a diagram illustrating this alternative embodiment of bus arbiter 300. Referring to FIG. 6, a module access number 652 is hardwired into comparator 306. Module access number 652 is unique for each module. Each module initializes a state machine 602 with a unique initialization value 656. Pulses of access time clock 308 clock state machine 602. At each pulse of access time clock 308, state machine output 654 increments. Comparator 306 compares state machine output 654 with module access number 652. When the numbers agree, a comparison time pulse 506 is generated. Comparison time pulse 506 is used to pull bus arbitration line 204 low as in the preferred embodiment. A pulse 502 of BUP clock signal 226 increments the state machine to a new state at the beginning of each new BUP time slot.

Referring again to FIG. 3, another alternative embodiment may be considered wherein bus busy signal 358 is routed directly to counter 304 (instead of to AND gate 318 as ilustrated). In this embodiment, counter 304 is inhibited from counting when bus busy signal 358 is low. Thus, AND gate 318 is not required.

In still another alternative embodiment of bus arbiter 300, bus request signal 362 is input to AND gate 318 thus enabling or inhibiting bus access without the need for AND gate 320.

These alternative embodiments serve as examples of the numerous functionally equivalent embodiments of the bus arbitration circuitry according to the present invention.

5. Prioritization Techniques

Bus arbitration according to the present invention provides flexibility in assigning and updating module priority. Numerous prioritization techniques are contemplated wherein module priorities are determined. Different prioritization schemes can be implemented based on the requirements of the computer system, thus optimizing system performance. Examples of such prioritization techniques are outlined in the text that follows.

Referring again to FIG. 3, as previously mentioned, the priority of a module is controlled by state machine 302. State machine 302 outputs a time access state 352 indicating the module priority. In its simplest configuration, state machine 302 is a fixed, hard-wired number. In this configuration, each module is assigned a unique, fixed priority number (time access state 352). The priority may be assigned according to a number of different strategies. For example, the priority number for each module may be assigned according to the location of the module on the bus.

In a preferred embodiment, state machine 302 is implemented in such a manner that it is updated at each BUP clock pulse 502. This allows the priority of each module to be altered for each BUP time slot. State machines 302 in all modules must be synchronized and be identical such that time access state 352 is unique for each module.

A variety of priority schemes for determining module priority at each BUP clock pulse 502 can be implemented. Implementation of these various schemes is accomplished by changing the manner in which state machine 302 is implemented. As an example, a simple priority scheme can be implemented by using a modulo-N counter as state machine 302. In this scheme, the modulo-N counter is initialized with the module number. Initialization takes place by sending an initialization signal 366 to state machine 302. Once initialized, all modules' modulo-N counters are decremented at each BUP slot by BUP clock pulse 502. Thus after each BUP time slot each module's priority is increased by one. If a module requests the bus and acquires it during one BUP time slot, the module time access window 352 is moved one access time later when BUP clock pulse 502 decrements the modulo-N counter. The module that had the lowest priority time access state is moved to the highest priority and all other modules decrease in priority.

Alternatively, a "round robin" scheme can be implemented by moving the access state of the module acquiring the VPB to the lowest priority (last time access) and incrementing the priority of all modules which had a lower priority. In this case, any module with an access state later than the module acquiring the bus would increment their states, those with higher priorities would remain in the current state, and the most recent bus user would move to the last access time. The update line to the state machine would control the state machine.

A pseudo random sequence (PRS) generator could also be used to generate the access time state. If all modules have identical PRS generators and each module initializes the generator with a unique state, such as it's module number, then all PRS generators are incremented at each BUP slot, giving all modules the same long term average bus priority. The state machine can be any machine which produces a unique state for each module and which can be synchronized by the initialization. This can include table lookup methods.

6. Extension of the Module Capacity

According to the arbitration technique as described above, the number of modules which can contend for bus access is limited by the ratio of the access time clock to the BUP clock. In other words, the number of modules which can contend for bus access is limited to the number of access time windows which can be created within one bus time slot.

From an implementation perspective, it is desirable to minimize the ratio of the access time clock to the BUP time clock. This however has the effect of limiting the number of modules which can be configured in the system.

This limitation can be overcome by implementing modules in groups of modules. In this implementation, a single arbitration line is provided for each group of modules. The arbitration lines are used to determine group priority as well as individual module priority.

Figure 7:
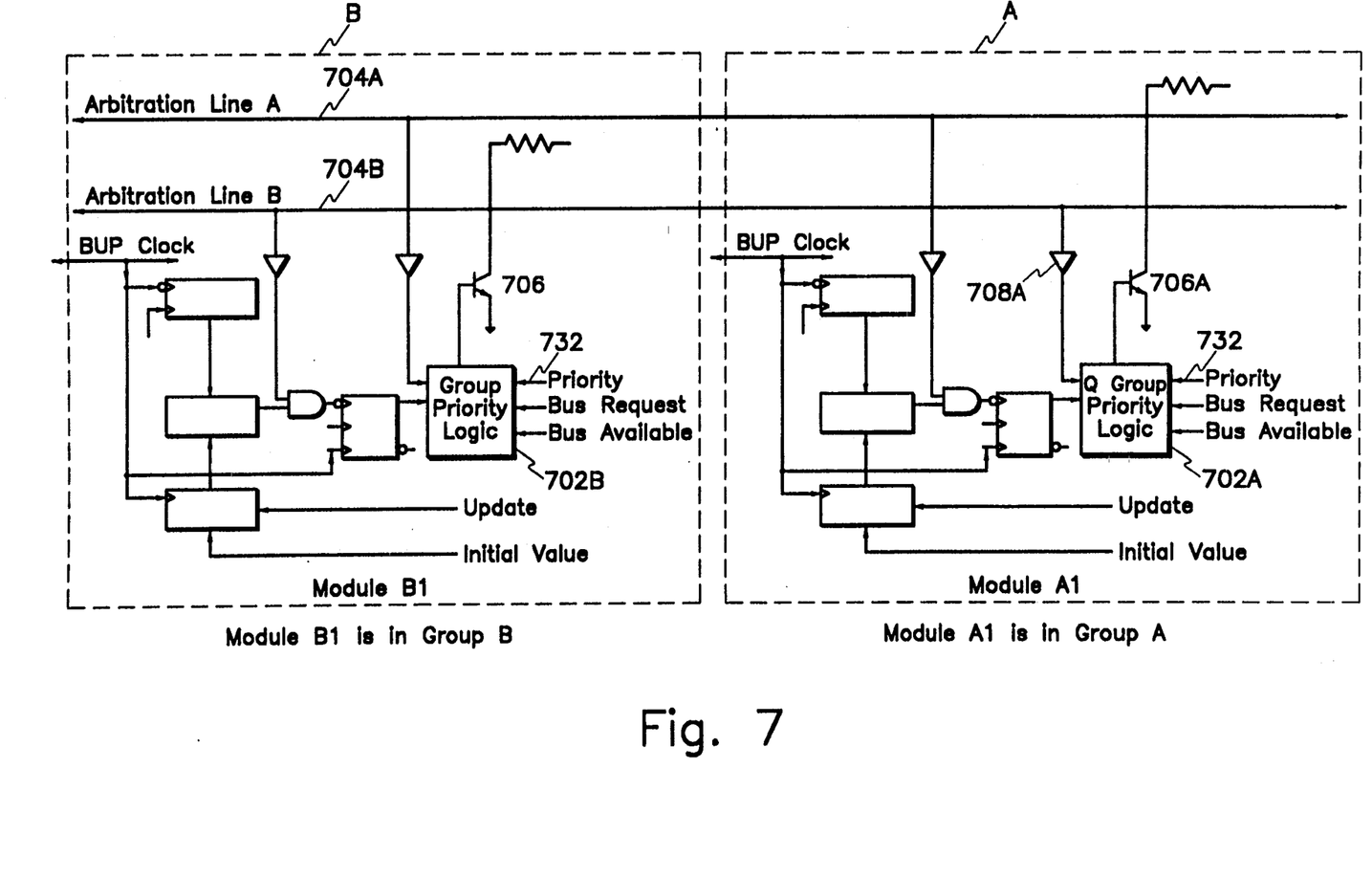
FIG. 7 is a block diagram illustrating arbitration among modules arranged in groups of modules.

FIG. 7 illustrates two modules, one module for each of two groups. The concept of group priority will be described with two groups of modules. It will be obvious to one of ordinary skill in the art how this concept can be expanded to any number of groups of modules. Referring to FIG. 7, a module A1 is illustrated as belonging to a group A. A module B1 is illustrating as belonging to a group B. Two arbitration lines 704A, 704B, are interfaced to all of the modules in group A and in group B. Only one module is shown in each group for simplicity.

Each module includes group priority logic 702. Group priority logic 702 is used to resolve bus contention conflicts among the groups.

A priority signal 732 is input into group priority logic 702. Priority signal 732 indicates the priority of the group. Each group has a unique priority value represented by priority signal 732.

All modules in group B contend for access to the bus in a manner as described in the preferred embodiments above. Assuming group B has the highest priority, once a module in group B is granted access to the bus, arbitration line 704B is pulled low by transistor 706. Once arbitration line 704 B is pulled low, a low signal is received by a buffer 708A in group A, and this low signal is input to group priority logic 702A at an input Q. This low signal at input Q of group priority logic 702A has the effect of disabling a module in group A from turning on transistor 706A and pulling arbitration line 704A low.

7. Operation at High Speeds

Figure 8:
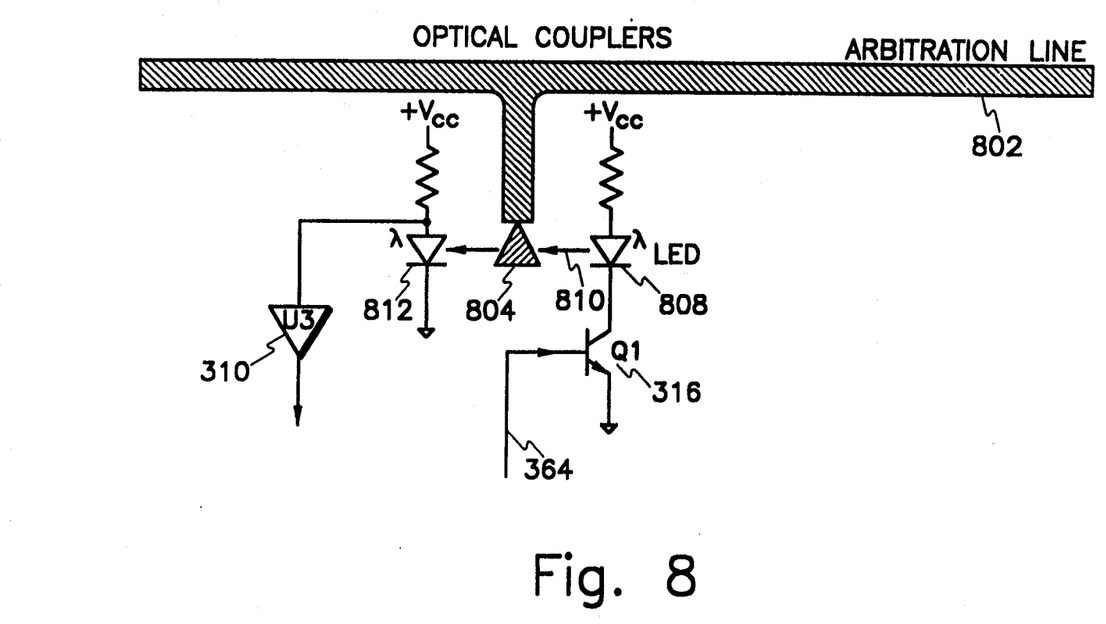
FIG. 8 is a diagram illustrating implementation of the arbitration circuit according to the present invention with an optical fiber arbitration line.

The speed of the arbitration line is a key factor in the overall speed of the virtual packet bus according to the present invention. The arbitration line can be implemented using an optical fiber to increase bandwidth. FIG. 8 illustrates an implementation of an arbitration line using an optical fiber. Referring to FIG. 8, the optical fiber implementation will now be described. Arbitration line 802 is implemented using an optical fiber. The optical fiber can be implemented as an incoherent optical fiber or simply, as an optical light pipe. The optical fiber arbitration line 802 is connected to the arbitration circuit using an optical coupler 804. A photodiode (Light Emitting Diode, LED) 808 transforms electrical current into an optical signal 810. Optical signal 810 is coupled onto arbitration line 802 by optical coupler 804. Thus when transistor 316 is turned on by a high bus available signal 364 (as in the above-described embodiment), current flows through LED 808. The resultant light from LED 808 is coupled onto arbitration line 802. Hence, when a module is granted access for the next BUP time slot, light is present on arbitration line 802.

A photodiode 812 receives optical energy from optical coupler 804. The absence of light on arbitration line 802 causes current in photodiode 812 to decrease to a level known as the dark current level. At the dark current level, current from $V_{cc}$ cannot be passed to ground, and a logic high is presented at the input of buffer 310.

If, on the other hand, light is present on arbitration line 802 photodiode 812 passes $V_{cc}$ to ground, thereby presenting a low signal to the input of buffer 310.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. An arbitration system for arbitrating bus access among a plurality of modules, the arbitration system comprising:
   a) a bus packet (BUP) clock coupled to each module, which defines BUP time slots;
   b) an access time clock coupled to each module, which divides a cycle period of said BUP clock into access time slots; and
   c) one arbitration circuit for each module comprising:
      1) a counter configured to count pulses of said access time clock, reset on pulses of said BUP clock, and provide a counter value signal,
      2) a state machine configured to provide a programmable priority value signal, wherein said state machine is updated by said BUP clock, and
      3) a comparator configured to provide a comparison time pulse.

2. The arbitration system of claim 1, further comprising a plurality of arbitration lines coupled to each of the modules, to provide arbitration among groups of modules, and wherein said arbitration circuit further comprises group arbitration logic coupled to at least one of said arbitration lines.

3. The arbitration system of claim 1 further comprising:
   d) a computer bus configured to transfer bits of words between the plurality of modules.

4. The arbitration system of claim 1, wherein said arbitration circuit further comprises:
   4) a flip-flop configured to provide a bus available signal.

5. The arbitration system of claim 4 further comprising:
   d) a single arbitration line coupled to each module.

6. The computer bus of claim 5, wherein said arbitration line is a fiber optic cable, and said arbitration circuit further comprises:
   (5) a first photodiode coupled between Vcc and a transistor, configured to emit light when said transistor is turned on by said bus available signal;
   (6) a second photodiode coupled between Vcc and ground, configured to provide a low bus busy signal when said second photodiode is turned on by light on the fiber optic cable; and
   (7) optical couplers for coupling light from said first photodiode into the fiber optic cable, and for coupling light out of the fiber optic cable to said second photodiode.

7. The arbitration system of claim 5, wherein said arbitration circuit further comprises:
   5) a transistor configured to assert said single arbitration line when said bus available signal is asserted, and
   6) a pull-up resistor coupled to Vcc and configured to unassert said single arbitration line when said transistor is not asserting said single arbitration line.

8. The arbitration system of claim 7, wherein said arbitration circuit further comprises:
   7) a buffer configured to provide a bus busy signal,
   8) a first AND gate responsive to said bus busy signal and said comparison time pulse, said first AND gate configured to set said flip-flop, and
   9) a second AND gate responsive to said flip-flop and a bus request signal, said second AND gate configured to provide said bus available signal.

9. An arbitration system for arbitrating bus access among a plurality of modules, the arbitration system comprising:
   a) a bus packet (BUP) clock coupled to each module, which defines BUP time slots;
   b) an access time clock coupled to each module, which divides a cycle period of said BUP clock into access time slots; and
   c) one arbitration circuit for each module comprising:
      1) a state machine configured to provide a programmable priority value signal, wherein said state machine is updated by said BUP clock,
      2) a module access number, and
      3) a comparator configured to provide a comparison time pulse.

10. The arbitration system of claim 9 further comprising:
    d) a computer bus configured to transfer bits of words between the plurality of modules.

11. The arbitration system of claim 9, wherein said arbitration circuit further comprises:
    4) a flip-flop configured to provide a bus available signal.

12. The arbitration system of claim 11 further comprising:
    d) a single arbitration line coupled to each module.

13. The arbitration system of claim 12, wherein said arbitration circuit further comprises:
    5) a transistor configured to assert said single arbitration line when said bus available signal is asserted, and
    6) a pull-up resistor coupled to Vcc and configured to unassert said single arbitration line when said transistor is not asserting said single arbitration line.

14. The arbitration system of claim 13 wherein said arbitration circuit further comprises:
    7) a buffer configured to provide a bus busy signal,
    8) a first AND gate responsive to said bus busy signal and said comparison time pulse, said first AND gate configured to set said flip-flop, and
    9) a second AND gate responsive to said flip-flop and a bus request signal, said second AND gate configured to provide said bus available signal.

15. An arbitration system for arbitrating bus access among a plurality of modules, the arbitration system comprising:
    a) an access time clock;
    b) a bus packet (BUP) clock; and
    c) one arbitration circuit for each module comprising:
       1) a counter having a first input coupled to said BUP clock, a second input coupled to said access time clock, and an output,
       2) a state machine having an input coupled to said BUP clock and an output, and
       3) a comparator having a first input coupled to said output of said counter, a second input coupled to said output of said state machine, and an output.

16. The arbitration system of claim 15 further comprising:
    d) a computer bus comprising a plurality of data lines coupled to each module.

17. The arbitration system of claim 15, wherein said arbitration circuit further comprises:

4) a flip-flop having an input coupled to said output of said comparator and responsive to a bus busy signal, and an output.

18. The arbitration system of claim 17 further comprising:
  d) a single arbitration line coupled to each module.

19. The arbitration system of claim 18, wherein said arbitration circuit further comprises:
  5) a transistor having a base coupled to said flip-flop output, an emitter coupled to ground, and a collector coupled to said single arbitration line, and
  6) a pull-up resistor coupled between said single arbitration line and Vcc.

20. The arbitration system of claim 19, wherein said arbitration circuit further comprises:
  7) a buffer having an input coupled to said single arbitration line and an output,
  8) a first AND gate with a first input coupled to said output of said comparator, a second input coupled to said output of said buffer, and an output coupled to said flip-flop, and
  9) a second AND gate with a first input coupled to said output of said flip-flop, a second input coupled to a bus request signal, and an output coupled to said base of said transistor.

21. An arbitration system for arbitrating bus access among a plurality of modules, the arbitration system comprising:
  a) an access time clock;
  b) a bus packet (BUP) clock; and
  c) one arbitration circuit for each module comprising:
    1) a state machine having a first input coupled to said BUP clock, a second input coupled to said access time clock, and an output, and
    2) a comparator having a first input coupled to said output of said state machine, and an output.

22. The arbitration system of claim 21 further comprising:
  d) a computer bus comprising a plurality of data lines coupled to each module.

23. The arbitration system of claim 21, wherein said arbitration circuit further comprises:
  3) a flip-flop having an input coupled to said output of said comparator and responsive to a bus busy signal, and an output.

24. The arbitration system of claim 23 further comprising:
  d) a single arbitration line coupled to each module.

25. The arbitration system of claim 24, wherein said arbitration circuit further comprises:

4) a transistor having a base coupled to said flip-flop output, an emitter coupled to ground, and a collector coupled to said single arbitration line, and
  5) a pull-up resistor coupled between said single arbitration line and Vcc.

26. The arbitration system of claim 25, wherein said arbitration circuit further comprises:
  6) a buffer having an input coupled to said single arbitration line and an output,
  7) a first AND gate with a first input coupled to said output of said comparator, a second input coupled to said output of said buffer, and an output coupled to said flip-flop, and
  8) a second AND gate with a first input coupled to said output of said flip-flop, a second input coupled to a bus request signal, and an output coupled to said base of said transistor.

27. A method for arbitrating bus access among a plurality of modules on a bus, the bus having a cycle clock, an access time clock, and a single arbitration line, comprising the steps of:
  a) counting a number of access time clock periods;
  b) generating a priority value signal using a state machine, wherein said priority value is updated by the cycle clock;
  c) comparing said priority value with a value representing said number of access time clock periods; and
  d) asserting control of the arbitration line if said priority value equals said number of access time clock periods.

28. The method of claim 27 further comprising the steps of:
  e) defining a cycle period using the cycle clock; and
  f) dividing said cycle period into access time slots using said access time clock.

29. A method for arbitrating bus access among a plurality of modules on a bus, the bus having a cycle clock, an access time clock, and a single arbitration line, comprising the steps of:
  a) generating a priority value signal using a state machine, wherein said priority value is changed each access time clock period and is updated by the cycle clock;
  b) comparing said priority value with a module access number; and
  c) asserting control of the arbitration line if said priority value equals said module access number.

30. The method of claim 29 further comprising the steps of:
  d) defining a cycle period using the cycle clock; and
  e) dividing said cycle period into access time slots using said access time clock.

* * * * *

UNITED STATES PATENT AND TRADEMARK OFFICE
CERTIFICATE OF CORRECTION

PATENT NO. : 5,430,848

DATED : July 4, 1995

INVENTOR(S) : Waggener

It is certified that error appears in the above-identified patent and that said Letters Patent is hereby corrected as shown below:

Column 7, line 5, replace "comrpise" with --comprise--; and

Column 13, line 40, replace "computer bus" with --arbitration system--.

Signed and Sealed this

Twelfth Day of March, 1996

Attest:

BRUCE LEHMAN

Attesting Officer    *Commissioner of Patents and Trademarks*